United States Patent [19]
Takenaka

[11] Patent Number: 5,823,050
[45] Date of Patent: Oct. 20, 1998

[54] MOTION TRANSFORMING APPARATUS

[75] Inventor: Hiroyuki Takenaka, Gifu-ken, Japan

[73] Assignee: Teijin Seiki Co., Ltd., Osaka, Japan

[21] Appl. No.: 730,455

[22] Filed: Oct. 15, 1996

[30] Foreign Application Priority Data

Oct. 24, 1995 [JP] Japan ................................. 7-275169

[51] Int. Cl.⁶ ............................ F16H 23/00; F16H 27/00
[52] U.S. Cl. ............................................. 74/116; 120/122
[58] Field of Search ............................ 74/112, 116, 120, 74/121, 122, 89

[56] References Cited

U.S. PATENT DOCUMENTS

| | | | |
|---|---|---|---|
| 5,187,994 | 2/1993 | Hirai et al. ................................. | 74/120 |
| 5,351,572 | 10/1994 | Vortmeyer .............................. | 74/122 X |
| 5,477,741 | 12/1995 | Takenaka et al. ......................... | 74/116 |
| 5,582,068 | 12/1996 | Fukui ........................................ | 74/116 |

Primary Examiner—Charles A. Marmor
Assistant Examiner—Troy Grabow
Attorney, Agent, or Firm—Lane, Aitken & McCann

[57] ABSTRACT

Herein disclosed is a motion transforming apparatus, comprising first and second rotation shafts each formed with crank shaft portions, a plate assembly constituted by rotation plates each formed with teeth and cranked through bores respectively having the crank shaft portions of the rotation shafts received therein, a toothed rail having teeth, and a plate assembly housing relatively movable along the toothed rail, wherein the first rotation shaft is driven to rotate the rotation plates, and each of the rotation plates has an untoothed portion connected to the toothed portion of each rotation plate to be spaced from the toothed portion of the toothed rail and to have the toothed portions of the rotation plates closer to the second rotation shaft than the first rotation shaft. The toothed portion of each rotation plate is thus deviated from the second rotation shaft and held in mesh with the toothed rail in the vicinity of the first rotation shaft, thereby reducing a moment which tends to rotate the plate assembly housing around the first rotation shaft so as to lift up the leading end of the plate assembly housing.

10 Claims, 7 Drawing Sheets

MOTION TRANSFORMING APPARATUS

BACKGROUND OF THE INVENTION

The present invention relates to a motion transforming apparatus for transforming an input rotation motion into a linear motion, and in particular to a motion transforming apparatus comprising a pair of rotation shafts adapted to crank and rotate a set of rotation plates to have the rotation plates held in mesh with a toothed rail and move relatively with respect to the toothed rail.

Conventionally, there have been provided various motion transforming apparatuses of this kind which are utilized in machine tools, robots, vehicles, feeding machines and the like. The motion transforming apparatuses are each required to procure compact size and light weight as well as simple structure for compactness of the machine tools, robots, vehicles, feeding machines or the like.

The prior art motion transforming apparatuses are classed typically into two types different from each other in direction of output linear motion with respect to the center axis of an input shaft. One of the above two types is known and represented by a ball thread mechanism as being useful for transforming an input rotation motion of a spindle with respect to a ball nut into a relative linear motion between the spindle and the ball nut with accuracy and high rigidity. The ball thread mechanism, however, encounters a drawback that the threaded spindle cannot be freely elongated in such a case that the ball nut or the threaded spindle is required to output a long stroke linear motion with accuracy and high rigidity. It is therefore difficult to utilize the ball thread mechanism for outputting a long stroke linear motion.

The other type is represented by a so-called rack-and-pinion structure comprising a rack rail and a pinion held in mesh with each other. The rack-and-pinion structure is so constructed that an input rotational motion of the pinion is transformed into a straight linear motion of the rack rail by way of a small number of teeth of the rack rail and the pinion meshing with one another. However, the rack rail and the pinion are inevitably required to become large in width in order to obtain a large thrust force for moving the rack rail with respect to the pinion. This results in such a drawback that the rack-and-pinion structure cannot avoid to become large in size.

In view of the foregoing drawbacks, there has been proposed by the present applicant an improved motion transforming apparatus. The motion transforming mechanism is schematically shown in FIGS. 6 and 7 as comprising first and second rotation shafts 11 and 12, a plate assembly 20, a toothed rail 30, and a plate assembly housing 40. The first rotation shaft 11 is connected to an external drive motor not shown, and driven by the external drive motor to rotate around its rotational center axis. The first and second rotation shafts 11 and 12 are each formed with three parallel crank shaft portions, and rotatable around their respective rotational center axes. The plate assembly 20 is constituted by three rotation plates 21A, 21B and 21C each having a toothed portion 22 formed with trochoidal teeth 22a, while the toothed rail 30 has a toothed portion 32 formed with semi-circular teeth 32a to be held in mesh with the teeth 22a. The rotation plates 21A to 21C are laterally juxtaposed with one another with their toothed portions 22 laterally adjacent to one another, and each cranked by the first and second rotation shafts 11 and 12 with the rotational center axes of the rotation shafts 11 and 12 spaced from and in parallel relationship with each other. The parallel rotation shafts 11 and 12 are respectively supported by the plate assembly housing 40 which is constituted by upper and lower segments 41 and 42 having the rotation shafts 11 and 12 rotatably received therebetween, and a plurality of bolts 43 having the segments 41 and 42 connected to each other. The plate assembly housing 40 is movable along the longitudinal axis of the toothed rail 30 relatively with respect to the toothed rail 30, and has the plate assembly 20 and the rotation shafts 11 and 12 partly accommodated therein. To inevitably regulate each distance from the longitudinal axis of the toothed rail 30 to each of the rotational center axes 11a, 12a of the rotation shafts 11 and 12, the toothed rail 30 and the plate assembly housing 40 respectively have both side portions having two set of guide balls rollably received therebetween. The above drive motor and the plate assembly housing 40 are mounted on a movable support member and regulated to move relatively with respect to each other, while the toothed rail 30 is mounted on a stationary support member by a plurality of bolts but not shown in the drawings.

When the first rotation shaft 11 is driven to rotate clockwise or counter clockwise around its center axis by the drive motor as shown in each of FIGS. 6 and 7, the rotation plates 21A to 21C are cranked around the rotational center axes of the rotation shafts 11 and 12. At this time, the toothed portions 32 of the rotation plates 21A to 21C are in turn brought into pressing contact with part of the toothed portion of the toothed rail 30, and the plate assembly housing 40 is moved by the rotation plates 21A to 21C of the plate assembly 20 through the rotation shafts 11 and 12.

In the above improved motion transforming apparatus, the toothed rail 30 can be segmented and freely elongated in such a case that the plate assembly housing 40 or the toothed rail 30 is required to output a long stroke linear motion with accuracy and high rigidity, thereby making it possible to utilize the motion transforming mechanism for outputting a long stroke linear motion. In addition, the teeth of the rotation plates 21A to 21C are respectively held in mesh with the teeth of the toothed rail so that the mechanism can output a linear motion with a large thrust force without producing excessive reactive forces exerted on the teeth of the rotation plates 21A to 21C.

The above plate assembly housing 40 inherent in the improved motion transforming apparatus, however, still encounters a drawback that the leading end portion of the plate assembly housing 40 is apt to be lifted up by a moment around the first rotation shaft 11 with the both side portions of the plate assembly housing 40 bent or elastically twisted because of the fact that the reactive forces exerted on the teeth of the rotation plates 21A to 21C are imbalanced around the first rotation shaft 11. Furthermore, clattering noises and other noises are made by not only the teeth of the rotation plates 21A to 21C and the toothed rail 30 but also the guide balls between the toothed rail 30 and the plate assembly housing 40. This means that the motion transforming mechanism cannot output an accurate and smooth linear motion without making the clattering noises and the like.

SUMMARY OF THE INVENTION

It is therefore an object of the present invention to provide a motion transforming apparatus wherein the plate assembly housing is smoothly movable along the toothed rail relatively with respect to the toothed rail without making clattering noises and the like.

It is another object of the present invention to provide a motion transforming apparatus which can output a linear motion accurately in response to an input rotation motion by preventing the leading end portion of the plate assembly housing from being lift up on the toothed rail, and both side portions of the plate assembly housing from being bent or elastically twisted.

It is a further object of the present invention to provide a compact motion transforming apparatus simple in structure and light in weight at a low cost.

According to one aspect of the present invention there is provided a motion transforming apparatus for transforming an input rotation motion into a relative linear motion, comprising: first and second rotation shafts each having a rotational center axis and respectively rotatable around the rotational center axes, each of the first and second rotation shafts being formed with at least three crank shaft portions having respective eccentric axes in parallel relationship with one another and to the rotational center axis, the eccentric axes of the crank shaft portions being displaced from and arranged equi-angularly around the rotational center axis of each of the first and second rotation shafts; a plate assembly constituted by at least three rotation plates each having a toothed portion formed with a plurality of teeth spaced from one another with a predetermined pitch, the rotation plates being laterally juxtaposed with one another with the toothed portions of the rotation plates laterally adjacent to one another, each of the rotation plates being formed with first and second cranked through bores having center axes in parallel relationship with each other, and the crank shaft portions of the first and second rotation shafts being rotatably received in the first and second cranked through bores of the rotation plates respectively with the rotational center axes of the first and second rotation shafts spaced from and in parallel relationship with each other; a toothed rail having a longitudinal axis extending longitudinally thereof and a mid-longitudinal plane perpendicularly intersected by the center axis of each of the first and second rotation shafts and extending on the longitudinal axis, the toothed rail including a support portion and a toothed portion having a plurality of teeth each protruding from the support portion, and the teeth of the toothed rail being spaced from one another with a pitch same as that of the teeth of the rotation plate and held in mesh with the teeth of the toothed portions of the rotation plates; and a plate assembly housing movable along the longitudinal axis of the toothed rail relatively with respect to the toothed rail and having the plate assembly and the first and second rotation shafts partly accommodated therein with each distance invariably regulated between the longitudinal axis of the toothed rail and each of the rotational center axes of the first and second rotation shafts. In this motion transforming mechanism, the first rotation shaft is driven by the input rotation motion to rotate the rotation plates around the rotational center axes of the first and second rotation shafts in cooperation with the second rotation shaft, and each of the rotation plates further having an untoothed portion connected to the toothed portion of each rotation plate and closer to the second rotation shaft than the first rotation shaft. The untoothed portion of each rotation plate faces and is spaced from the toothed portion of the toothed rail. On the other hand, the toothed portion of the toothed rail is pressed by the toothed portions of the rotation plates while the rotation plates are being rotated by the crank shaft portions of the first rotation shaft around the rotational center axes of the first and second rotation shafts.

The untoothed portion and the toothed portion of each rotation plate define a connecting line at which the toothed and untoothed portions of each rotation plate are connected with each other, and the connecting line may be perpendicular to the mid-longitudinal plane of the toothed rail in spaced and parallel relationship with the first and second central planes of the first and second rotation shafts, and positioned between the first and second rotation shafts. The teeth of each the rotation plate may have a wave configuration in cross-section taken along the mid-longitudinal plane of the toothed rail, and the teeth of the toothed rail each may have a semi-circular configuration in cross-section taken along the mid-longitudinal plane of the toothed rail.

The toothed rail may be constituted by a rail member extending along the longitudinal axis of the toothed rail and a plurality of cylindrical pins laterally extending in parallel relationship with one another and each rotatably supported by the rail member. In this case, the cylindrical pins may be partly embedded in and partly protruding from the rail member, the teeth of the toothed rail being semi-circular in cross-section taken along the mid-longitudinal plane of the toothed rail. The teeth of the toothed rail may upwardly face the teeth of the toothed portions of the rotation plates which are each in the form of a trochoidal tooth profile.

The motion transforming apparatus may further comprise guiding means for guiding the plate assembly housing and the toothed rail with respect to each other along the longitudinal axis of the toothed rail and for invariably regulating each distance between the longitudinal axis of the toothed rail and each of the rotational center axes of the first and second rotation shafts to ensure the toothed rail and the plate assembly housing to relatively smoothly move with respect to each other.

BRIEF DESCRIPTION OF THE DRAWINGS

The features and advantages of a motion transforming mechanism according to the present invention will be more clearly understood from the following description taken in conjunction with the accompanying drawings in which.

DESCRIPTION OF THE PREFERRED EMBODIMENTS

Figure 1:
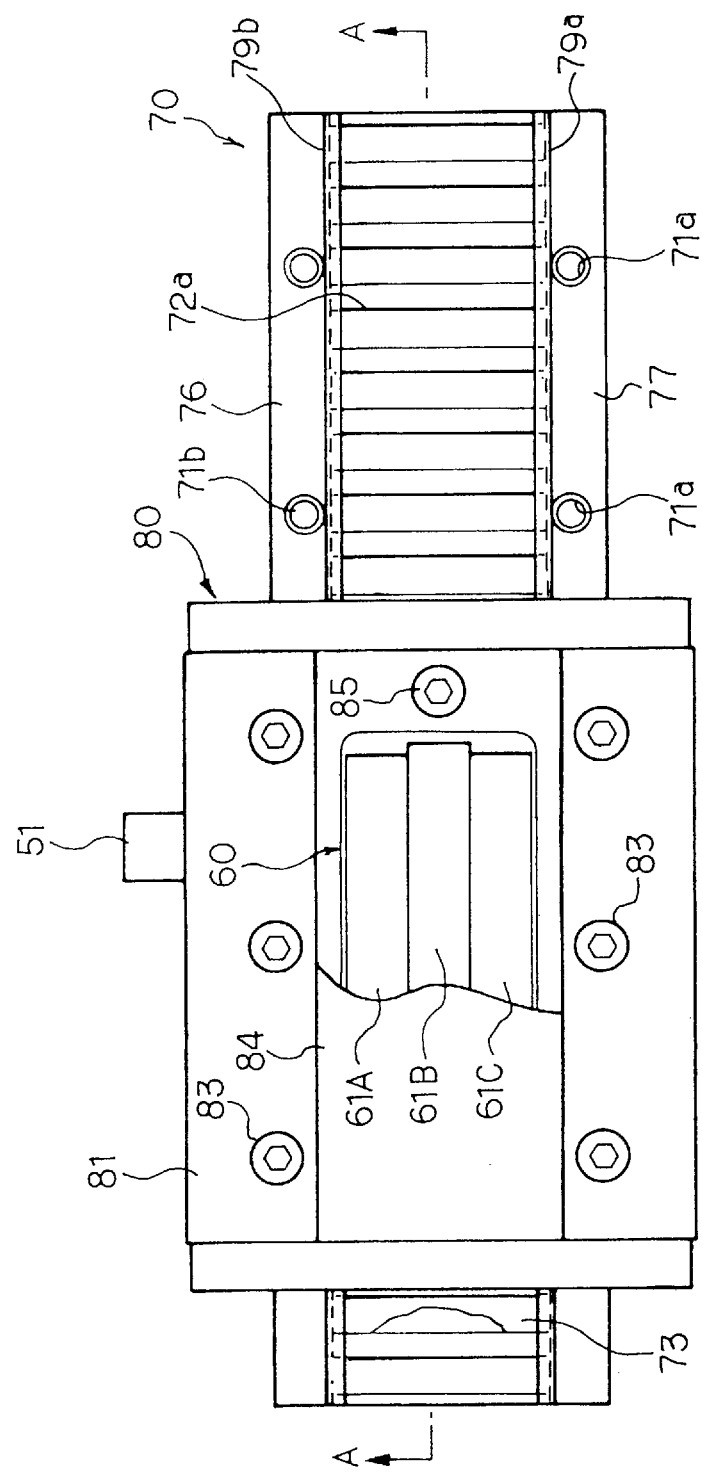
FIG. 1 is a plan view of an embodiment of the motion transforming mechanism according to the present invention.

Referring to FIGS. 1 to 5 of the drawings, a preferred embodiment of a motion transforming apparatus embodying the present invention is shown as comprising first and second rotation shafts 51 and 52, a plate assembly 60 assembled together with the first and second rotation shafts 51 and 52, a toothed rail 70 partly facing the plate assembly 60, and a plate assembly housing 80 having the first and second rotation shafts 51 and 52 and the plate assembly 60 partly accommodated therein.

The first and second rotation shafts 51 and 52 have their respective rotational center axes 51a and 52a, and are respectively rotatable around the rotational center axes 51a and 52a. As shown in FIG. 3(a), the first rotation shaft 51 is formed with at least three crank shaft portions 53, 54 and 55 having respective eccentric axes 53e, 54e and 55e in parallel relationship with one another and to the rotational center axis 51a of the first rotation shaft 51. Similarly, the second rotation shaft 52 is formed with at least three crank shaft portions 56, 57 and 58 having respective eccentric axes 56e, 57e and 58e in parallel relationship with one another and to the rotational center axis 52a of the second rotation shaft 52 as shown in FIG. 3(b). The eccentric axes 53e to 55e of the crank shaft portions 53 to 55 and the eccentric axes 56e to 58e of the crank shaft portions 56 to 58 are respectively displaced from and arranged equi-angularly around the rotational center axis 51a and 52a of the first and second rotation shafts 51 and 52.

The plate assembly 60 is constituted by at least three rotation plates 61A, 61B and 61C each having a toothed portion 62 formed with a plurality of wave-like, e.g., cycloidal or trochoidal teeth 62a spaced from one another with a predetermined pitch. The rotation plates 61A to 61C are laterally juxtaposed with one another with the toothed portions 62 of the rotation plates 61A to 61C laterally adjacent to one another. Each of the rotation plates 61A to 61C is formed with first and second cranked through bores 61e and 61f having center axes in parallel relationship with each other. The crank shaft portions 53 to 55 of the first rotation shaft 51 and the crank shaft portions 56 to 58 of the second rotation shaft 52 are rotatably received through a plurality of needle roller bearings 66a, 66b, 66c and 67a, 67b, 67c in the first and second cranked through bores 61e and 61f of the rotation plates 61A to 61C, respectively, with the rotational center axes 51a and 52a of the first and second rotation shafts 51 and 52 spaced from and in parallel relationship with each other. The rotation shafts 51 and 52 are respectively supported by the plate assembly housing 80 through a plurality of roller bearings 59a and 59b. To assemble the first and second rotation shafts 51 and 52 with the rotation plates 61A to 61C, the cranked through bores 61e, 61f of the rotation plate 61B are larger in diameter than those of the other two rotation plates 61A and 61C as well as the crank shaft portions 54 and 57 are larger in diameter than the crank shaft portions 53, 55, 56 and 58.

The first rotation shaft 51 supported by the plate assembly housing 80 has a first central plane 51c passing through the rotational center axis 51a of the first rotation shaft 51 and perpendicular to the longitudinal axis 70a of the toothed rail 70, while the second rotation shaft 52 has a second central plane 52c passing through the rotational center axis 52a of the second rotation shaft 52 and perpendicular to the longitudinal axis 70a of the toothed rail 70.

The toothed rail 70 has a longitudinal axis 70a extending longitudinally thereof and a mid-longitudinal plane 70b perpendicularly intersected by the center axis 51a or 52a of each of the first and second rotation shafts 51 and 52 and extending on the longitudinal axis 70a of the toothed rail 70. The toothed rail 70 includes a support portion consisting of a rail member 71 having a plurality of bolt holes 71a and 71b, a toothed portion 72 having a plurality of teeth 72a (See FIG. 2) each protruding from the support portion 71 at a pitch same as that of the toothed portion 62 of the toothed rail 61A to 51C, and a pair of retainer plates each bent to have a L-shaped cross section thereof. The support portion 71 of the toothed rail 70 may consist of a plurality of rail members arranged in a line to extend along the longitudinal axis 70a of the toothed rail 70. The teeth 72a of the toothed rail 70 are spaced from one another with a pitch same as that of the teeth 62a of the rotation plates 61A to 61C, and held in mesh with the teeth 62a of the toothed portions 62 of the rotation plates 61A to 61C. The toothed rail 70 is mounted at its lower end coupler position 70c on a certain stationary member not shown in the drawings, but may be supported by a movable support member. The teeth 72a are constituted by a plurality of cylindrical pins 73, which may be greased or coated with a dry type lubricating material if the reactive forces R1 and R2 are large sufficient to move relatively heavy weights. The cylindrical pins 73 for the toothed portion 72 of the toothed rail 70 may also be made of a self-lubricating material. The teeth 72a of the toothed portion 72 of the toothed rail 70 constructed as above upwardly face the trochoidal teeth 62a of the toothed portions 62 of the rotation plates 61A to 61C.

The plate assembly housing 80 is constituted by rectangular upper and lower housing segments 81 and 82, a plurality of bolts 83 having the upper and lower housing segments 81 and 82 firmly connected to each other, and a cover plate 84 detachably mounted on the upper housing segment 82 by a bolt 85. The plate assembly housing 80 is movable along the longitudinal axis of the toothed rail 70 relatively with respect to the toothed rail 70, and has the plate assembly 60 and the first and second rotation shafts 51 and 52 partly accommodated therein with each distance invariably regulated between the longitudinal axis 70a of the toothed rail 70 and each rotational center axis 51a, 52a of the first or second rotation shaft 51 or 52. The upper and lower housing segments 81 and 82 have respective pairs of upper and lower semi-circular concave portions 81a, 81b and 82a, 82b which collectively form two pairs of coaxial circular holes having the first and second rotation shafts 51 and 52 respectively received therein.

In order to linearly move the plate assembly housing 80 relatively with respect to the toothed rail 70, the toothed portion 72 of the toothed rail 70 is adapted to be pressed by the toothed portions 62 of the rotation plates 61A to 61C when each pair of the crank shaft portions 51 and 56, 52 and 57, or 53 and 58 of the rotation shafts 51 and 52 received in the first and second cranked through bores 61e and 61f of each rotation plate 61A, 61B or 61C are positioned within their predetermined cranking angle ranges identical to each other around the rotational center axes 51a and 52a of the first and second rotation shafts 51 and 52.

The toothed rail 70 further includes both side portions 76, 77 (See FIG. 1) each formed with a rail groove 76a or 77a extending in parallel relationship with the longitudinal axis 70a of the toothed rail 70 and having a triangular concave cross section, while the plate assembly housing 80 has both inner side portions 86, 87 spaced apart from each other in opposing and spaced relationship with the both side portions 76, 77 of the toothed rail 70 to rotatably support the first and second rotation shafts 51 and 52 and each formed with a housing groove 86a or 87a extending in parallel with each of the rail grooves 76a and 77a of the toothed rail 70 and having a triangular cross section. The inner side portions 86, 87 of the plate assembly housing 80 are supported only at the upper portions by the second housing segment 82 of the plate assembly housing 80.

The motion transforming apparatus further comprises guiding means 90 for guiding the plate assembly housing 80 and the toothed rail 70 with respect to each other along the longitudinal axis 70a of the toothed rail 70 and for invariably regulating each distance between the longitudinal axis 70a of the toothed rail 70 and each of the rotational center axes 51a and 52a of the first and second rotation shafts 51 and 52 to ensure the toothed rail 70 and the plate assembly housing 80 to relatively smoothly move with respect to each other. The guiding means 90 is constituted by plural sets of guide balls 91 and 92 rollably received in the rail grooves 76a and 77a of the toothed rail 70 and the housing grooves 86a, 87a of the plate assembly housing 80, respectively, to ensure the toothed rail 70 and the plate assembly housing 80 to relatively smoothly move with respect to each other.

Each of the housing grooves 86a and 87b of the plate assembly housing 80 is partly intersected by the first and second central planes 51c and 52c of the first and second rotation shafts 51 and 52, and has closed longitudinal ends not shown in spaced relationship with and protruding outwardly of the first and second central planes 51c and 52c of the first and second rotation shafts 51 and 52. The rail groove 76a, 77a of the toothed rail 70 and the housing groove 86a, 87a of the plate assembly housing 80 partly form a pair of parallel guide ball paths 91, 92 each square in cross section. The parallel guide ball paths are at their both ends continuously connected to a pair of guide ball paths 93, 94 formed in the lower housing segment 82 of the plate assembly housing 80. The rail grooves 76a and 77a of the toothed rail 70, the housing grooves 86a, 87a of the plate assembly housing 80, and the guide ball paths 93 and 94 as a whole form a pair of endless guide ball paths through which the guide balls 91 and 92 are rolled and circulated to partly guide the plate assembly housing 80 with respect to the toothed rail 70 and to have the toothed portions 62 of each rotation plate 61A, 61B, 61C supported by the first and second rotation shafts 51 and 52 in parallel with the toothed portion 72 of the toothed rail 70.

The above first rotation shaft 51 is elongated at one end portion 51d and connected to an external drive motor or other driving mechanism but not shown in the drawings. The first rotation shaft 51 is adapted to be driven by the input rotation motion from the external drive motor and to rotate the rotation plates 61A to 61C around the rotational center axes 51a and 52a of the first and second rotation shafts 51 and 52, in cooperation with the second rotation shaft 52, in such a manner that the rotation plates 61A to 61C are cranked by the crank shaft portions 53 to 55 and 56 to 58 of the rotation shafts 51 and 52 to trace respective circular parallel-displacement paths. The input rotation motion of the first rotation shaft 51 is controlled by a controller, not shown in the drawings, to determine the rotational angle or the number of rotations to have the plate assembly housing 80 linearly move along the toothed rail 70 by a certain amount of displacement relatively with respect to the toothed rail 70. The plate assembly housing 80 and the above drive motor are mounted on and supported by a stationary support member or a support member movable along the longitudinal axis 70a of the toothed rail 70 relatively with respect to the toothed rail 70. The plate assembly housing 80 and the above drive motor are thus regulated to move relatively with respect to each other on the support member.

Figure 2:
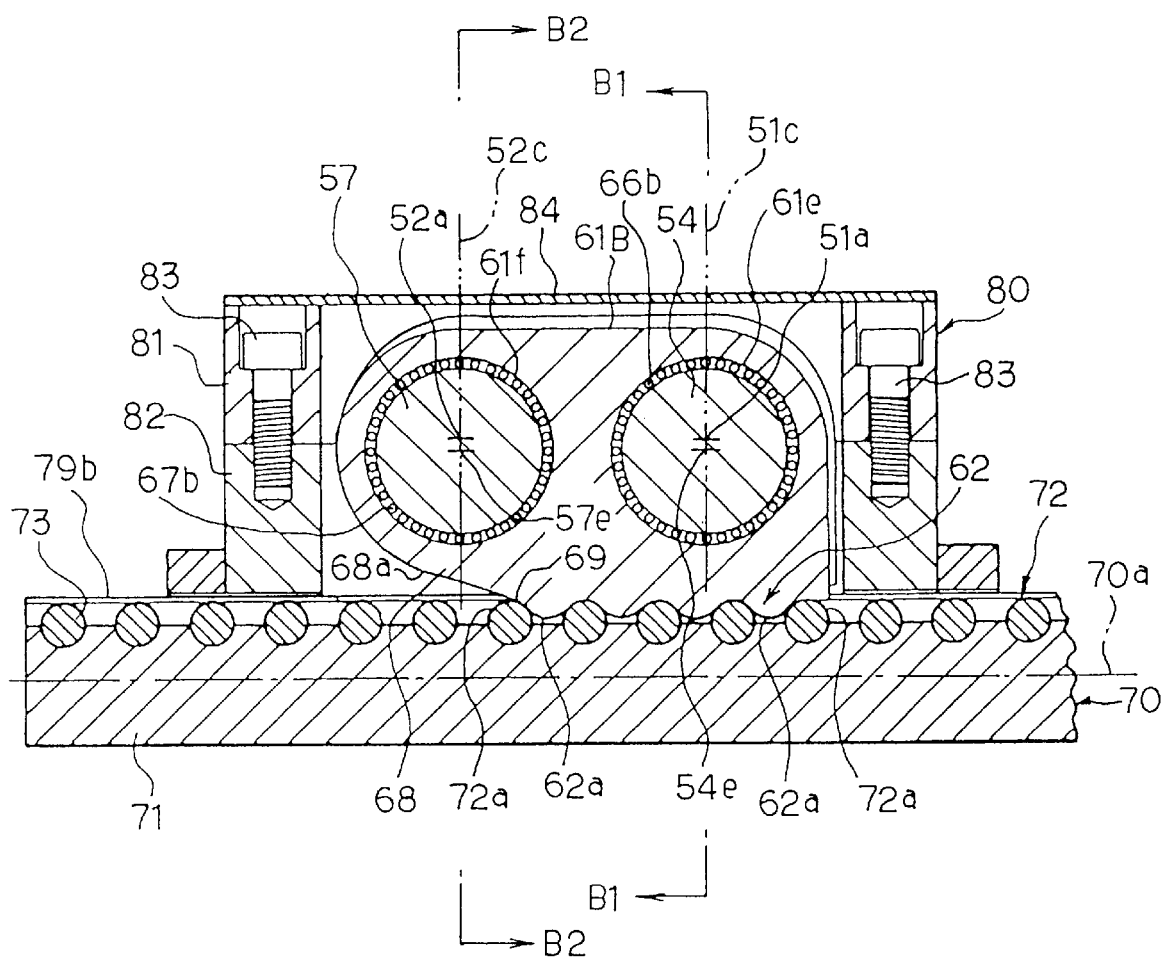
FIG. 2 is an elevational sectional view taken along the line A—A in FIG. 1 and showing rotation plates, first and second rotation shafts, a pate assembly housing and a toothed rail each forming part of the motion transforming apparatus.
Figure 3:
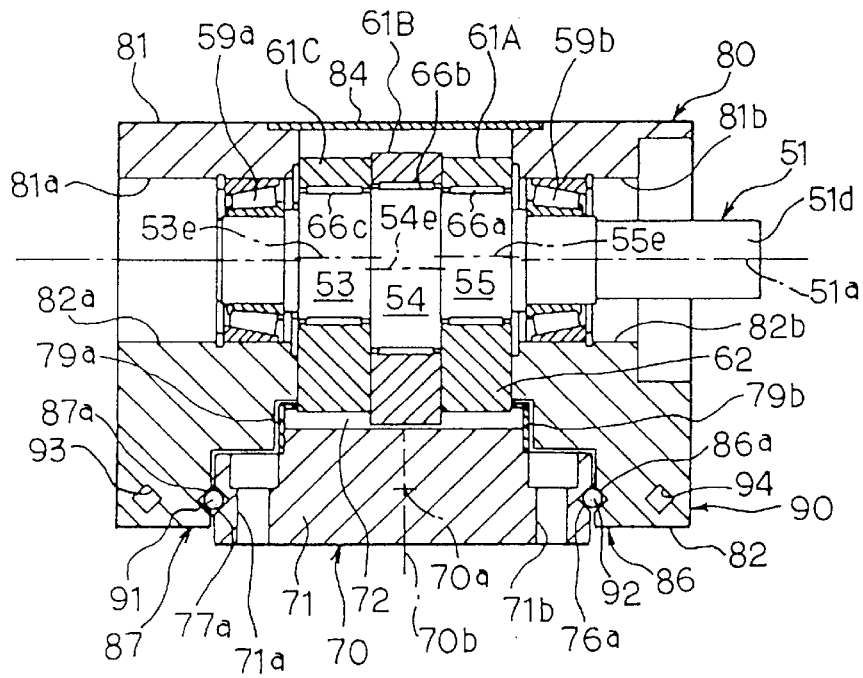
FIG. 3(a) is a cross-sectional view taken along the line B1—B1 in FIG. 2 and showing three crank shaft portions of the first rotation shaft.
FIG. 3(b) is a cross-sectional view taken along the line B2—B2 in FIG. 2 and showing three crank shaft portions of the second rotation shaft and untoothed portions respectively formed in the rotation plates.
Figure 3:
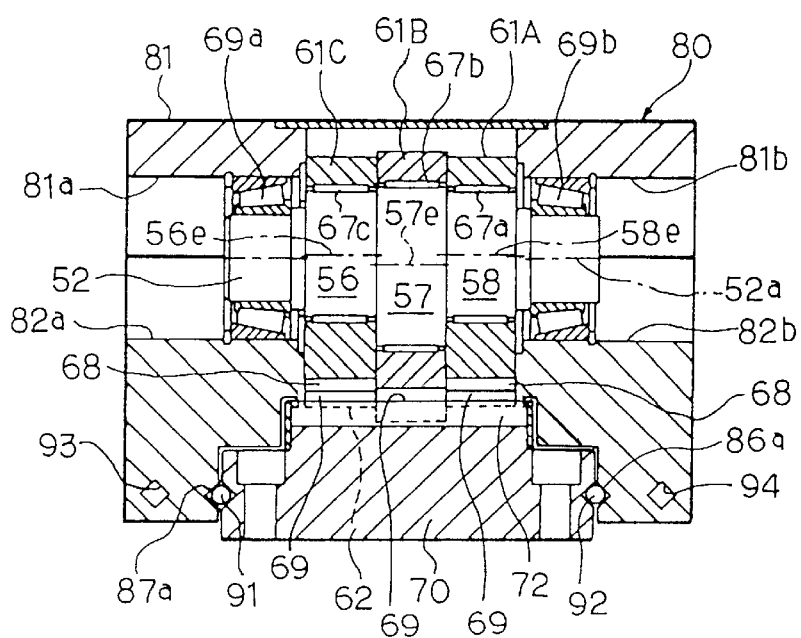

As best shown in FIG. 2, each of the above rotation plates 61A to 61C further has an untoothed portion 68 connected to the toothed portion 62 of each rotation plate 61A, 61B or 61C. The untoothed portion 68 is positioned to be closer to the second rotation shaft 52 than the first rotation shaft 51 under the state that the teeth 62a of the toothed portion 62 of each rotation plate 61A, 61B or 61C is brought into pressing and meshing contact with the teeth 72a of the toothed rail 70 at a position closest to the longitudinal axis 70a of the toothed rail 70. The untoothed portion 68 of each rotation plate 61A, 61B or 61C faces the toothed portion 72 of the toothed rail 70 but is spaced from the toothed portion 72 of the toothed rail 70. The untoothed portion 68 and the toothed portion 62 of each rotation plate 61A, 61B or 61C define a connecting line 69 at which the toothed and untoothed portions 62 and 68 of each rotation plate 61A, 61B or 61C are integrally connected to each other. The connecting line 69 extends perpendicularly to the mid-longitudinal plane 70b of the toothed rail 70 in spaced and parallel relationship with the first and second central planes 51c and 52c of the first and second rotation shafts 51 and 52, and positioned between the first and second central planes 51c and 52c of the first and second rotation shafts 51 and 52.

The rotation plates 61A to 61C are thus different from those of the prior art motion transforming apparatus in shape and in the toothed portions 62 closer to the first rotation shaft 51 than to the second rotation shaft 52. This means that each of the rotation plates 61A to 61C has first and second half portions which are respectively formed with the first and second cranked through bores 61e, 61f and different from each other in the number of the teeth 62a formed therein, and that the number of the teeth 62a formed in the first half portion is larger than the number of the teeth 62a formed in the second half portion. The first and second half portions of each rotation plate 61A, 61B or 61C are integrally connected to each other at a central plane equally spaced from the first and second cranked through bores 61e, 61f and perpendicularly intersected by the longitudinal axis 70a of the toothed rail 70. The untoothed portion 68 of each of the rotation plates 61A to 61C is exemplified in FIG. 2 to have a slanted surface 68a slanted at an angle with respect to the longitudinal axis 70a of the toothed rail 70 with its one end close to the second rotation shaft 52 and the other end connected to the toothed portion 62 of the rotation plate 61A to 61C at the connecting line 69. The untoothed portion 68 of each rotation plates 61A, 61B or 61C may be modified into any shape to have a surface facing the toothed portion 72 of the toothed rail 70 in spaced relationship with the toothed portion 72 of the toothed rail 70.

The above linear motion of the plate assembly housing 80 or the toothed rail 70 includes straight motion, curvilinear motion and other substantially linear motion. The parallel grooves 76a, 77a and 86a, 87a may therefore be formed to have their radii of curvature.

The operation of the motion transforming apparatus will be described hereinlater.

Firstly, the first rotation shaft 51 is driven by the input rotation motion from the above external drive motor. The angle of the input rotation is controlled by the drive motor and the above controller to move the plate assembly housing 80 by a necessary displacement amount relatively with respect to the toothed rail 70. At this time, the rotation plates 61A to 61C are each rotated by the input rotation motion of the first rotation shaft 51 under the state that the rotation plates 61A to 61C are respectively cranked to be displaced equi-angularly from one another by the crank shaft portions 53 to 55 and 56 to 58 of the first and second rotation shafts 51 and 52.

Under these conditions, the rotation plates 61A to 61C have their rotational phases every 120 degrees, and the trochoidal teeth 62a of the toothed portion 62 of each rotation plate 61A, 61B or 61C are brought into pressing contact with the semicircular teeth 72a of the toothed portion 72 of the toothed rail 70 when the teeth 62a of the toothed portion 62 of each rotation plate 61A, 61B or 61C alternately come close to the dedendum portions of the teeth 72a of the toothed rail 70 from the addendum portions while the crank shaft portions 53 to 55 and 56 to 58 of the first and second rotation shafts 51 and 52 rotate respectively around the rotational center axes 51a and 52a of the first and second rotation shafts 51 and 52. Therefore, the semicircular teeth 72a of the toothed rail 70 is continuously partly pressed by the trochoidal teeth 62a of at least one of the rotation plates 61A, 61B and 61C while the teeth 62a of each rotation plate 61A, 61B or 61C come to be held in meshing engagement with the teeth 72a of the toothed rail 70 at a displaced angle of 120 degrees.

Figure 4:
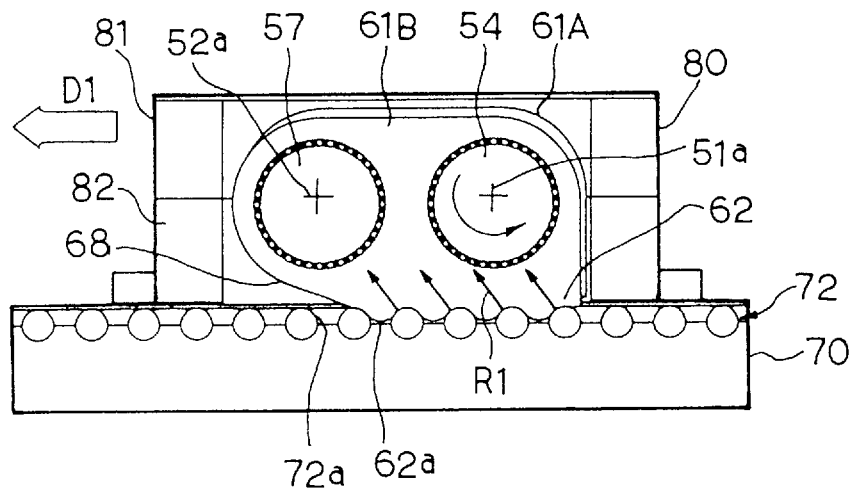
FIG. 4 is an explanatory elevational view showing a relative linear motion between the plate assembly housing and the toothed rail when the first rotation shaft is driven in the counter clockwise direction.
Figure 5:
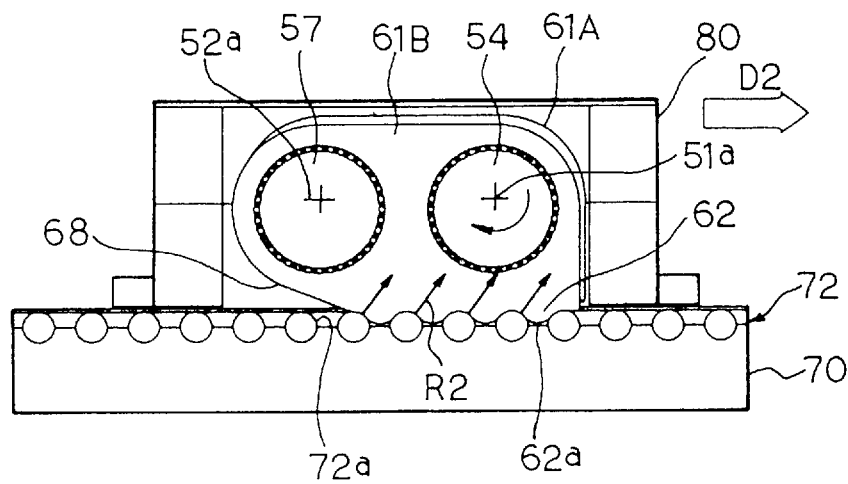
FIG. 5 is an explanatory elevational view showing a relative linear motion between the plate assembly housing and the toothed rail with the first rotation shaft driven in the clockwise direction.
Figure 6:
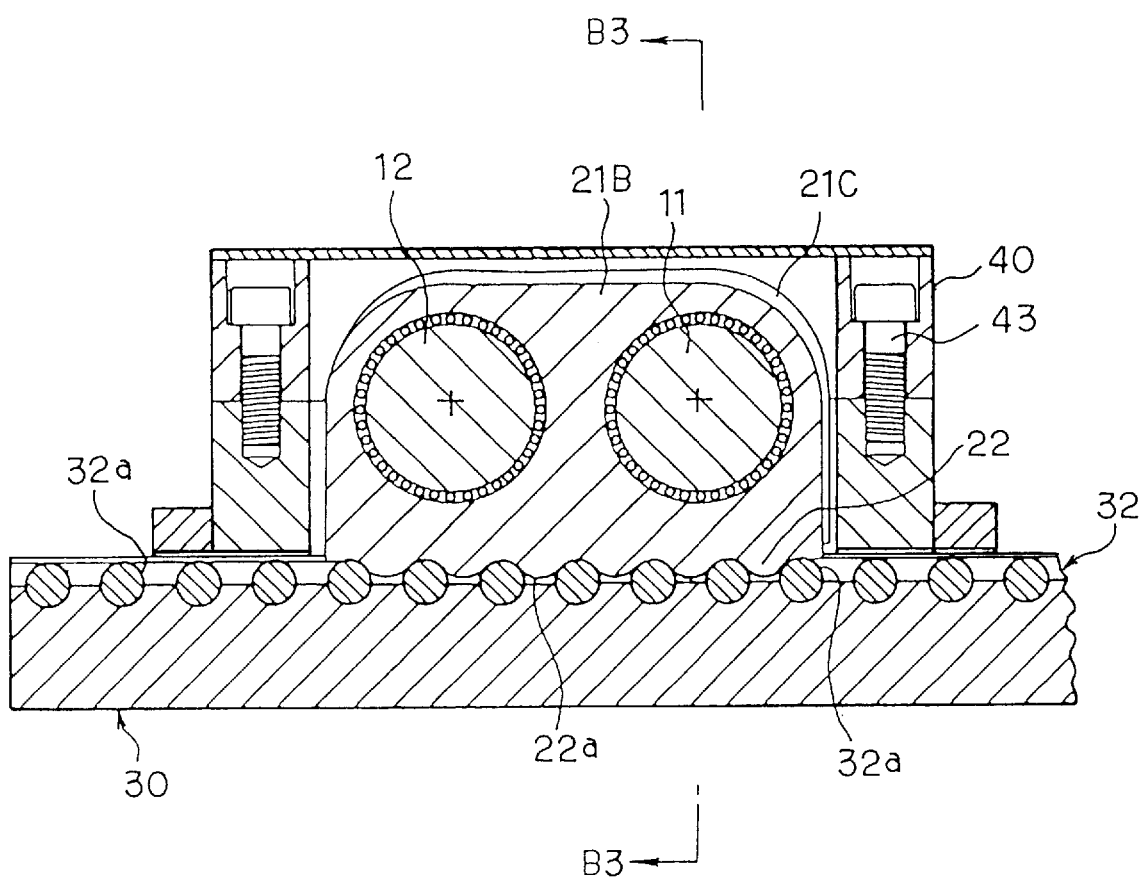
FIG. 6 is an elevational sectional view of a prior art motion transforming mechanism and showing rotation plates, first and second rotation shafts, a pate assembly housing and a toothed rail each forming part of the prior art motion transforming apparatus.
Figure 7:
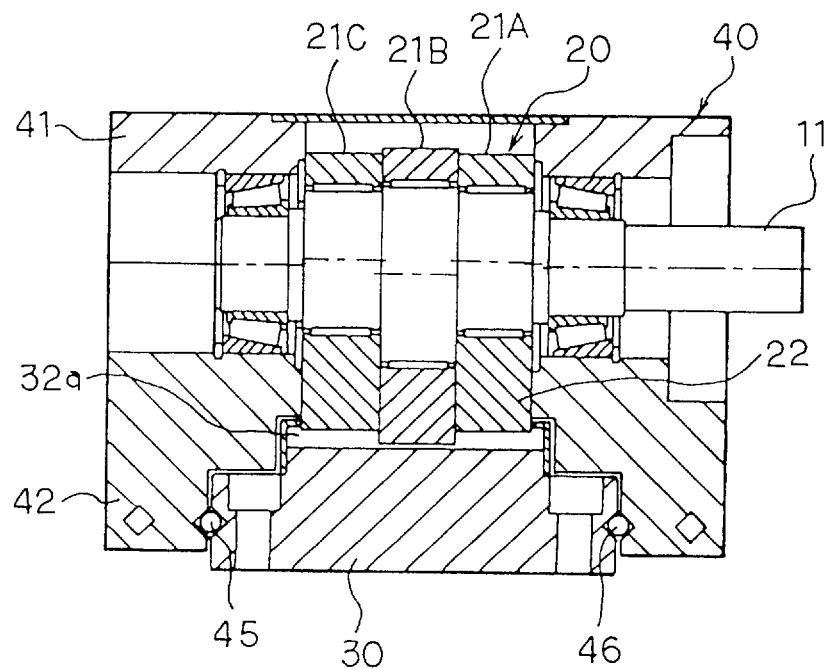
FIG. 7 is a cross-sectional view taken along the line B3—B3 in FIG. 6.
Figure 8:
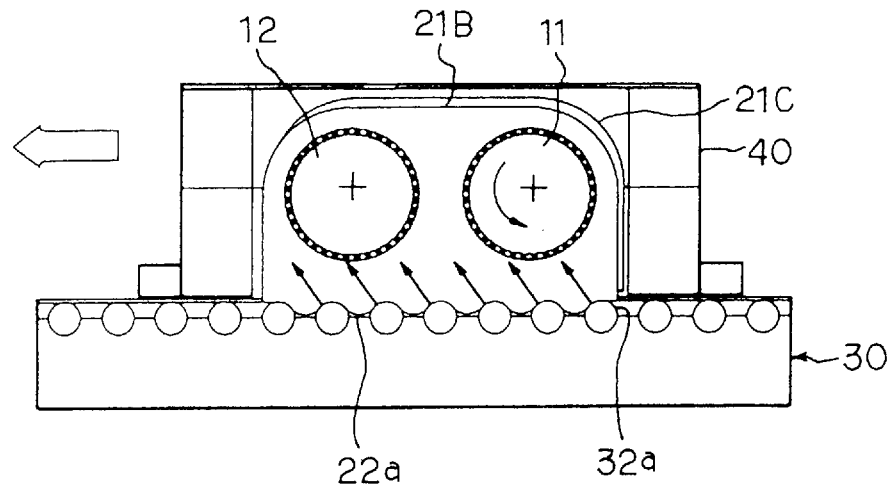
FIG. 8 is an explanatory elevational view showing the imbalance of the moment around the first rotation shaft of the prior art motion transforming apparatus when the first rotation shaft is driven in the counter clockwise direction.
Figure 9:
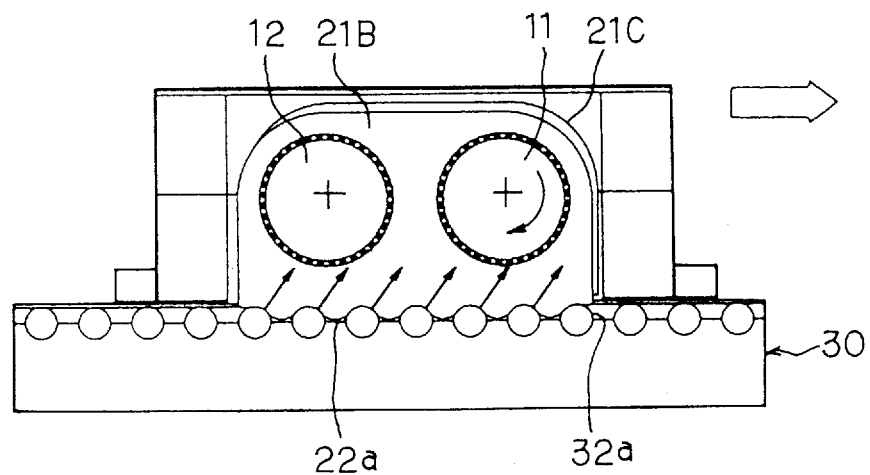
FIG. 9 is an explanatory elevational view showing the imbalance of the moment around the first rotation shaft of the prior art motion transforming apparatus when the first rotation shaft is driven in the clockwise direction.

The semi-circular teeth 72a of the toothed rail 70 partly pressed by the trochoidal teeth 62a of at least one rotation plate 61A, 61B or 61C produce reactive forces to be exerted on the teeth 62a of the rotational plate 61A, 61B or 61C as shown by arrows R1 in FIG. 4 or arrows R2 in FIG. 5 under the state that the plate assembly housing 80 is guided by the guiding means 90 to be movable only in the longitudinal direction of the toothed rail 70.

When the first rotation shaft 51 is driven to rotate counter clockwise as shown in FIG. 4, the reactive forces are inclined to left as shown by the arrows R1. At this time, the plate assembly housing 80 is moved by the reactive forces R1 toward left along the longitudinal axis 70a of the toothed rail 70 relatively with respect to the toothed rail 70, as shown by an arrow D1, in spite of the fact that the reactive forces R1 act on the rotation plates 61A to 61C not only as thrust forces but also as the upward forces which tend to lift up and separate the rotation plates 61A to 61C from the toothed portion 72 of the toothed rail 70. The reactive forces R1 also produces a moment which tend to rotate the plate assembly housing 80 clockwise in FIG. 4 around the first rotation shaft 51. However, the moment acting the plate assembly housing 80 is relatively small because of the fact that the first rotation shaft 51 is close to all contact points at which the reactive forces R1 respectively act on the teeth 62a of the rotation plates 61A to 61C and that the clockwise moment caused by part of the reactive forces R1 around the first rotation shaft 51 is canceled by the clockwise moment caused by part of the reactive forces R1 around the second rotation shaft 52.

When, on the other hand, the first rotation shaft 51 is driven to rotate clockwise as shown in FIG. 5, the reactive forces are inclined to right as shown by the arrows R2. At this time, the plate assembly housing 80 is moved by the reactive forces R2 toward right along the longitudinal axis 70a of the toothed rail 70 relatively with respect to the toothed rail 70, as shown by an arrow D2, in spite of the fact that the reactive forces R2 act on the rotation plates 61A to 61C not only as thrust forces but also as the upward forces which tend to lift up and separate the rotation plates 61A to 61C from the toothed portion 72 of the toothed rail 70. The reactive forces R2 also produces a moment which tend to rotate the plate assembly housing 80 clockwise around the first rotation shaft 51. The moment acting the plate assembly housing 80 is relatively small because of the fact that the clockwise and counter clockwise moments caused by the reactive forces R2 around the first rotation shaft 51 are balanced and that the first rotation shaft 51 is close to all contact points at which the reactive forces R2 respectively act on the teeth 62a of the rotation plates 61A to 61C.

As aforementioned, the plate assembly housing 80 is moved relatively with respect to the toothed rail 70 along the longitudinal axis 70a of the toothed rail 70 without producing any extremely large moment around the input rotation shaft 51. This makes it possible to provide a motion transforming apparatus which can output a linear motion smoothly and accurately in response to the input rotation motion of the first rotation shaft 51 by preventing the leading end portion of the plate assembly housing 80 from being lift up and both side portions of the plate assembly housing 80 from being bent or elastically twisted even in the case that the plate assembly housing 80 is relatively small and the inner side portions 86, 87 of the plate assembly housing 80 are formed as so-called cantilevers.

The plate assembly housing 80 can also be smoothly movable along the toothed rail 70 relatively with respect to the toothed rail 70 without making clattering noises, vibration or the like. Consequently, the above motion transforming apparatus comprising the partly cutout and untoothed rotation plates 61A to 61C is easily produced to have its compact size, mechanical simplicity and light weight at a low cost.

It will therefore be understood from the foregoing description that the rotation plates 61A to 61C are different from those of the prior art motion transforming apparatus in shape, and so modified as to balance the clockwise and counter clockwise moments caused by the reactive forces exerted on the toothed portion 62 of the rotation plates 62 around the first rotation shaft 51 that is a rotation input shaft of the mechanism.

While the present invention has thus been shown and described with reference to the specific embodiment, however, it should be noted that the invention is not limited to the details of the illustrated structures but changes and modifications may be made without departing from the scope of the appended claims.

What is claimed is:

1. A motion transforming apparatus for transforming an input rotation motion into a relative linear motion, comprising:

first and second rotation shafts each having a rotational center axis and respectively rotatable around the rotational center axes, each of said first and second rotation shafts being formed with at least three crank shaft portions having respective eccentric axes in parallel relationship with one another and to said rotational center axis, said eccentric axes of said crank shaft portions being displaced from and arranged equiangularly around said rotational center axis of each of said first and second rotation shafts;

a plate assembly constituted by at least three rotation plates each having a toothed portion formed with a plurality of teeth spaced from one another with a predetermined pitch, said rotation plates being laterally juxtaposed with one another with said toothed portions of said rotation plates laterally adjacent to one another, each of said rotation plates being formed with first and second cranked through bores having center axes in parallel relationship with each other, and said crank shaft portions of said first and second rotation shafts being rotatably received in said first and second cranked through bores of said rotation plates respectively with said rotational center axes of said first and second rotation shafts paced from and in parallel relationship with each other;

a toothed rail having a longitudinal axis extending longitudinally thereof and a mid-longitudinal plane perpendicularly intersected by the center axis of each of said first and second rotation shafts and extending on said longitudinal axis, said toothed rail including a support portion, and a toothed rail including a support portion and a toothed portion having a plurality of teeth each protruding from said support portion, and the teeth of said toothed rail being spaced from one another with the same pitch as that of the teeth of said rotation plates and held in mesh with said teeth of said toothed portions of said rotation plates; and a plate assembly housing movable along the longitudinal axis of said toothed rail relatively with respect to said toothed rail and having said plate assembly and said first and second rotation shafts partly accommodated therein with the distance between the longitudinal axis of said toothed rail and each of the rotational center axes of said first and second rotation shafts being maintained constant.

wherein said first rotation shaft is driven by said first and second rotation shafts in cooperation with said second rotation shaft, each of said rotation plates further having an untoothed portion connected to said toothed portion of each rotation plate and closer to said second rotation shaft than said first rotation shaft with said toothed portion being closer to said first rotation shaft than said second rotation shaft, said untoothed portion of each rotation plate facing and being spaced from said toothed portion of said toothed rail, and said toothed portion of said toothed rail being pressed by said toothed portions of said rotation plates while said rotation plates are being rotated by said crank shaft portions of said first rotation shaft around said rotational center axes of said first and second rotation shafts.

2. A motion transforming apparatus as set forth in claim 1, wherein said first rotation shaft has a first central plane passing through said rotational center axis of said first rotation shaft and perpendicular to said longitudinal axis of said toothed rail, and said second rotation shaft has a second central plane passing through said rotational center axis of said second rotation shaft and perpendicular to said longitudinal axis of said toothed rail, and wherein said untoothed portion and said toothed portion of each rotation plate define a connecting line at which said toothed and untoothed portions of each rotation plate are connected with each other, said connecting line being perpendicular to said mid-longitudinal plane of said toothed rail in spaced and parallel relationship with said first and second central planes of said first and second rotation shafts, and positioned between said first and second central planes of said first and second rotation shafts.

3. A motion transforming apparatus as set forth in claim 1, wherein said teeth of each said rotation plate have a wave configuration in cross-section taken along said mid-longitudinal plane of said toothed rail, and wherein the teeth of said toothed rail each has a semi-circular configuration in cross-section taken along said mid-longitudinal plane of said toothed rail.

4. A motion transforming apparatus as set forth in claim 1, wherein said toothed rail is constituted by a rail member extending along said longitudinal axis of said toothed rail and a plurality of cylindrical pins laterally extending in parallel relationship with one another and each rotatably supported by said rail member.

5.. A motion transforming apparatus as set forth in claim 4, wherein said cylindrical pins are partly embedded in and partly protruding from said rail member, said teeth of said toothed rail being semi-circular in cross-section taken along said mid-longitudinal plane of said toothed rail.

6. A motion transforming apparatus as set forth in claim 5, wherein said teeth of said rotation plates are each in the form of a trochoidal tooth profile.

7. A motion transforming apparatus as set forth in claim 1, further comprising at least three bearings received in said first and second cranked through bores of said rotation plates to allow said crank shaft portions of said first rotation shafts to be journaled therein, respectively.

8. A motion transforming apparatus as set forth in claim 1, which further comprises guiding means for guiding said plate assembly housing and said toothed rail with respect to each other along the longitudinal axis of said toothed rail and for maintaining constant each distance between the longitudinal axis of said toothed rail and each of the rotational center axes of said first and second rotation shafts to ensure the toothed rail and the plate assembly housing to relatively smoothly move with respect to each other.

9. A motion transforming apparatus as set forth in claim 8, wherein said toothed rail has both side portions each formed with a rail groove extending in parallel relationship with the longitudinal axis of said toothed rail, and said plate assembly housing has both inner side portions spaced apart from each other in opposing and spaced relationship with said both side portions of said toothed rail to rotatably support said first and second rotation shafts and each formed with a housing groove extending in parallel with each of said rail grooves of said toothed rail, and wherein said guiding means is constituted by a plurality of guide balls rollably received in said rail grooves and said housing grooves to ensure the toothed rail and the plate assembly housing to relatively smoothly move with respect to each other.

10. A motion transforming apparatus as set forth in claim 9, wherein each of said housing grooves of said plate assembly housing is partly intersected by said first and second central planes of said first and second rotation shafts, and has closed longitudinal ends in spaced relationship with and protruding outwardly of said first and second central planes of said first and second rotation shafts.

* * * * *